US012618161B2

(12) United States Patent
Dumoulin et al.

(10) Patent No.: US 12,618,161 B2
(45) Date of Patent: *May 5, 2026

(54) HIGH TEMPERATURE ELECTROLYSER SYSTEM OPTIMIZED BY INCREASING THE PRESSURE AT THE ELECTROLYSER OUTPUT

(71) Applicant: COMMISSARIAT A L'ENERGIE ATOMIQUE ET AUX ENERGIES ALTERNATIVES, Paris (FR)

(72) Inventors: Pierre Dumoulin, Grenoble Cedex (FR); Nicolas Tauveron, Grenoble Cedex (FR); Guillaume Montzieux, Grenoble Cedex (FR); Vincent Lacroix, Grenoble Cedex (FR); Brigitte Gonzalez, Grenoble Cedex (FR); Jean-Baptiste Lopez-Velasco, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/250,771

(22) PCT Filed: Oct. 25, 2021

(86) PCT No.: PCT/EP2021/079529
§ 371 (c)(1),
(2) Date: Apr. 27, 2023

(87) PCT Pub. No.: WO2022/090150
PCT Pub. Date: May 5, 2022

(65) Prior Publication Data
US 2023/0392267 A1     Dec. 7, 2023

(30) Foreign Application Priority Data
Oct. 30, 2020     (FR) ........................................ 2011119

(51) Int. Cl.
*C25B 1/042* (2021.01)
*C25B 15/021* (2021.01)
*C25B 15/08* (2006.01)

(52) U.S. Cl.
CPC ............ *C25B 1/042* (2021.01); *C25B 15/021* (2021.01); *C25B 15/083* (2021.01); *Y02E 60/36* (2013.01)

(58) Field of Classification Search
CPC ......... C25B 1/04; C25B 1/042; C25B 15/021; C25B 15/08; C25B 15/087
USPC ................................................. 204/274, 538
See application file for complete search history.

(56) References Cited

U.S. PATENT DOCUMENTS 11,060,196 B2* 7/2021 Colomar ................. C25B 15/08
11,171,342 B2 11/2021 Chatroux et al.
(Continued)

FOREIGN PATENT DOCUMENTS

EP        3 168 330 A1      5/2017
EP        3 511 441 A1      7/2019
(Continued)

OTHER PUBLICATIONS

Ferrero et al. "A comparative assessment on hydrogen production from low- and high-temperature electrolysis." International Journal of Hydrogen Energy 38 (2013) 3523-3536 (Year: 2013).*
(Continued)

*Primary Examiner* — Luan V Van
*Assistant Examiner* — Alexander R. Parent
(74) *Attorney, Agent, or Firm* — Oblon, McClelland, Maier & Neustadt, L.L.P.

(57)     ABSTRACT
A system including a high temperature electrolyser, a first supply line of the electrolyser configured to supply steam, a first discharge line of the electrolyser configured to discharge dihydrogen, a second discharge line of the electro-
(Continued)

lyser configured to discharge dioxygen, a first heat exchange module configured to provide heat exchange between the first supply line and the first discharge line, and a steam generator arranged on the first supply line and configured to produce steam from liquid water. The system also includes a module for recovering thermal energy from the dihydrogen at the output of the module for the benefit of the first steam supply line, the module having a compressor arranged in the first discharge line and configured to compress the dihydrogen, and a first heat exchanger arranged between the first supply line and the first discharge line to transmit thermal energy of the compressed dihydrogen to liquid water.

18 Claims, 1 Drawing Sheet

(56) References Cited

U.S. PATENT DOCUMENTS

| | | | | |
|---|---|---|---|---|
| 11,959,699 | B2 * | 4/2024 | Molter | C25B 1/04 |
| 2013/0126360 | A1 * | 5/2013 | Ise | C25B 1/04 |
| | | | | 205/412 |
| 2018/0287179 | A1 * | 10/2018 | Rueger | C25B 15/02 |

FOREIGN PATENT DOCUMENTS

| | | | | |
|---|---|---|---|---|
| FR | 3 054 932 A1 | 2/2018 | | |
| JP | 2007040593 A | * | 2/2007 | ........ F25B 2309/061 |
| JP | 2018-524465 A | 8/2018 | | |

OTHER PUBLICATIONS

Petrone "Heat Capacity: Can't Take the Heat?" BRIDGE ocean science education (2022) masweb.vims.edu/bridge/datatip_print.cfm?Bridge_Location=archive0909.html (Year: 2022).*

Min et al. "Thermodynamic analysis of a solid oxide co-electrolysis cell system for its optimal thermal integration with external heat supply" Energy Conversion and Management 225 (2020) 113381 (Year: 2020).*

International Search Report & Written Opinion issued Feb. 9, 2022 in PCT/EP2021/079529 filed on Oct. 25, 2021 7 pages.

* cited by examiner

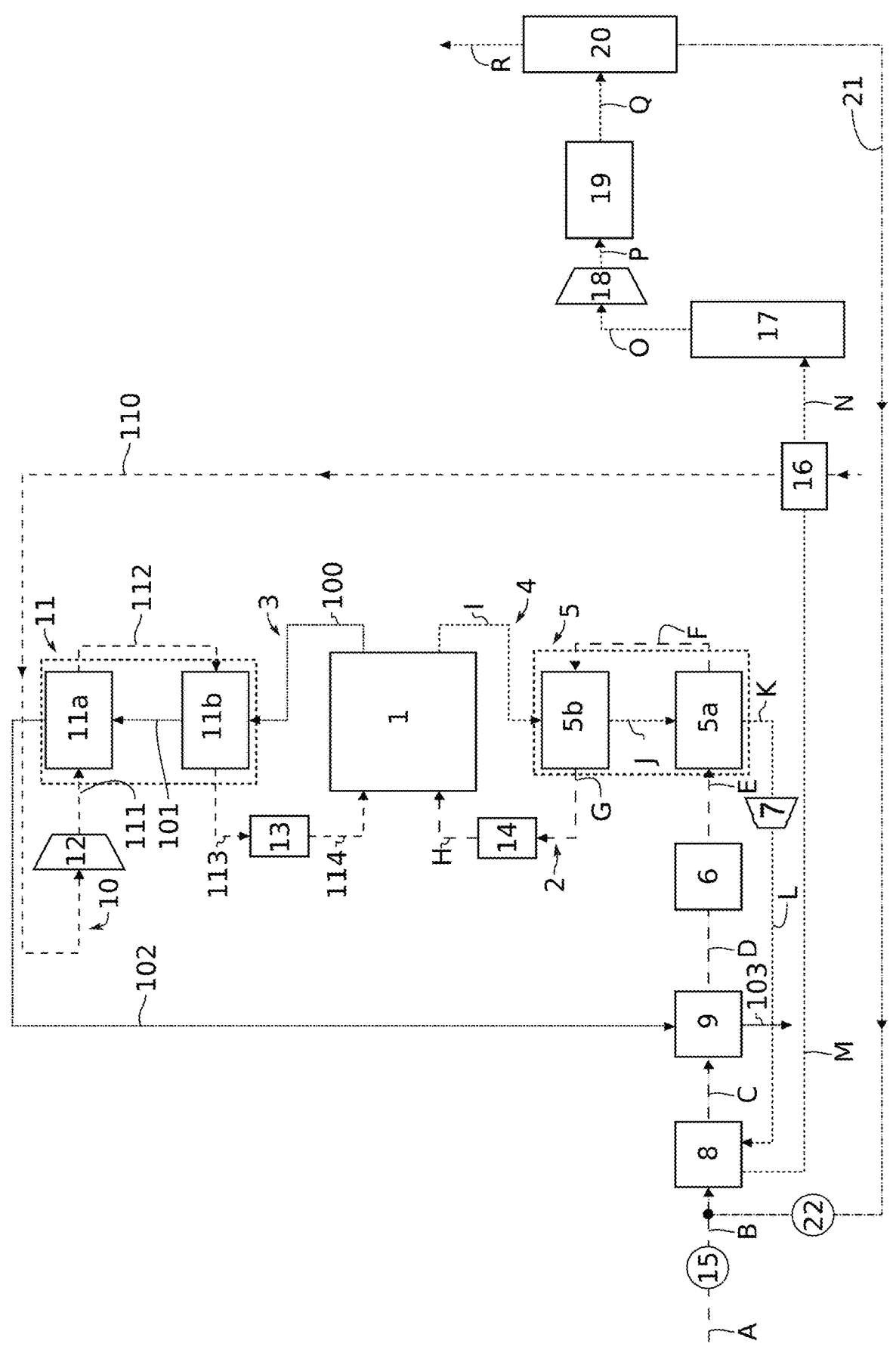

HIGH TEMPERATURE ELECTROLYSER SYSTEM OPTIMIZED BY INCREASING THE PRESSURE AT THE ELECTROLYSER OUTPUT

TECHNICAL FIELD OF THE INVENTION

The present invention relates to the field of High Temperature water Electrolysis (HTE) or High Temperature Steam Electrolysis (HTSE), also with Solid Oxide Electrolyte Cells (SOEC) and Solid Oxide Fuel Cells (SOFC). It is particularly useful for optimising the energy consumption of an SOEC electrolyser system.

PRIOR ART

The electrolysis of water is an electrolytic reaction which breaks down water into dioxygen and dihydrogen gas by using an electric current according to the reaction:

$$H_2O \rightarrow H_2 + \tfrac{1}{2}O_2.$$

For the electrolysis of water, it is advantageous to perform it at a high temperature of typically between 600 and 950° C., as some of the energy needed for the reaction can be provided by heat which is cheaper than electricity and the activation of the reaction is more effective at a high temperature and does not require a catalyst. A solid oxide electrolyte cell (SOEC) comprises in particular:—a first porous conductive electrode, or "cathode", intended to be supplied with steam for the production of dihydrogen, —a second porous conductive electrode, or "anode", through which the dioxygen produced by the electrolysis of the water injected onto the cathode escapes, and—a solid oxide membrane (dense electrolyte) sandwiched between the cathode and the anode, the membrane being anionically conductive at high temperatures, usually temperatures above 600° C. By heating the cell to at least this temperature and by injecting an electric current I between the cathode and the anode, there is a reduction of water at the cathode, which generates dihydrogen ($H_2$) at the cathode and dioxygen at the anode.

To perform high temperature steam electrolysis HTSE, steam $H_2O$ is injected into the cathodic compartment.

From the effect of the current applied to the cell, the dissociation of water molecules in vapour form occurs at the interface between the hydrogen electrode (cathode) and the electrolyte; this dissociation produces dihydrogen gas $H_2$ and oxygen ions. The dihydrogen is collected and discharged at the output of the hydrogen compartment. The oxygen ions migrate through the electrolyte and recombine into dioxygen $O_2$ at the interface between the electrolyte and the oxygen electrode (anode).

For the effective implementation of stack electrolysis, the stack is heated to a temperature above 600° C., usually a temperature of between 600° C. and 950° C., the gas supply is switched on at a constant flow rate, and an electrical power source is connected between two terminals of the stack in order to make the current I circulate there.

The efficiency of the electricity to hydrogen conversion is a key point, in order to ensure the competitiveness of the technology. Most of the electricity consumption takes place during the electrolysis reaction itself, but about 30% of the electrolyser's consumption comes from the thermal/hydraulic fluid management system. This relates to the external architecture of the electrolyser and the management of fluids and thermal energy within this architecture.

The evaporation of the water used in the electrolyser causes the highest energy consumption in this thermal/ hydraulic management system. Typically, this function is performed by an electric steam generator which consumes 20% of the total consumption of the electrolyser.

Furthermore, generally a significant amount of energy is released into the surrounding environment. For example, during the drying phase of the hydrogen and its compression, it is necessary to cool down this mixture strongly to allow the condensation of the water present in the water/hydrogen mixture. This condensation mostly takes place at a temperature lower than the evaporation temperature of the water at the inlet to the electrolyser, which means that very little of this condensation energy can be used.

It is therefore necessary to minimise this consumption by optimising the architecture and the fluid management of the electrolyser system.

It is therefore an object of the present invention to provide an optimised high temperature electrolyser system.

Further objects, features and advantages of the present invention will become apparent from the following description and the accompanying drawings. It is understood that other advantages may be included.

SUMMARY OF THE INVENTION

To achieve this objective, according to one embodiment, the invention provides a system comprising a high temperature electrolyser (HTE), a first electrolyser supply line configured to supply steam to the electrolyser, a first electrolyser discharge line configured to discharge dihydrogen from the electrolyser, a second electrolyser discharge line configured to discharge dioxygen from the electrolyser, a first heat exchange module configured to provide a thermal exchange between the first steam supply line and the first dihydrogen discharge line, a steam generator arranged in the first steam supply line, upstream of the first heat exchange module, and configured to produce steam from liquid water, characterised in that the system comprises a module for recovering the thermal energy of dihydrogen at the output of the first heat exchange module for the benefit of the first steam supply line, the recovery module comprising; a compressor arranged on the first dihydrogen discharge line, downstream of the first heat exchange module, and configured to compress the dihydrogen, a first heat exchanger arranged between the first steam supply line, upstream of the steam generator, and the first dihydrogen discharge line, downstream of the compressor, so as to transmit the thermal energy of the compressed dihydrogen to the liquid water, upstream of the steam generator.

This arrangement makes it possible to allow thermal energy to be recovered from the dihydrogen produced by the electrolyser to participate in the evaporation of the liquid water and therefore reduce the energy consumption of the system, while taking into consideration the component constraints allowing the use of standard components.

Thus, the system uses the heat of the dihydrogen at the output of the electrolyser, but after the first heat exchange module, so that the compression of the dihydrogen raises the temperature of the dihydrogen above the evaporation temperature of the liquid water and so that the first heat exchanger is satisfied with a heat exchanger suitable for temperatures below 300° C., for example, and therefore easily available on the commercial market.

Thus, the architecture of the system is optimised, more precisely, the thermo-hydraulic architecture external to the electrolyser is optimised by the present invention by allowing the recovery of waste energy from the dihydrogen for the benefit of the system by increasing the pressure at the output of the electrolyser.

Advantageously, the system comprises a second supply line of the electrolyser configured to supply the electrolyser with air or a gas containing oxygen.

Advantageously, the system comprises a third heat exchanger arranged between the first dihydrogen discharge line, downstream of the first heat exchanger of the energy recovery module, and the second air supply line.

Thus, the third heat exchanger, arranged between the second air supply line and the first dihydrogen discharge line, makes it possible to use the residual heat of the dihydrogen to heat the air entering the electrolyser. The third exchanger advantageously replaces an air cooler, typically used for the condensation of dihydrogen, which makes it possible to avoid the energy consumption of the fan of the air cooler, which is a high consumer of energy.

BRIEF DESCRIPTION OF THE FIGURES

The aims, objects, features and advantages of the invention will be better understood from the detailed description of an embodiment thereof, which is illustrated by the following accompanying drawings in which:

FIG. 1 is a block diagram showing the system according to the invention.

The drawings are given by way of example and are not in any way limiting for the invention. They are schematic representations of principle for facilitating the understanding of the invention and are not necessarily true to scale for practical applications.

DETAILED DESCRIPTION OF THE INVENTION

Before proceeding to a detailed review of embodiments of the invention, optional features are set out below which may be used in combination or alternatively;

According to an example, the system comprises a second heat exchanger arranged between the second dioxygen discharge line and the first steam supply line, upstream of the steam generator, so as to transmit the thermal energy of the dioxygen to the liquid water upstream of the steam generator.

Thus, this second heat exchanger is involved in raising the temperature of the liquid water before the steam generator so as to limit its energy consumption by recovering heat from the dioxygen produced by the electrolyser.

According to an example, the second heat exchanger is arranged downstream of the first heat exchanger in the first steam supply line. Advantageously, the source with energy at the lowest temperature is used first, so that the highest temperature energy is exploited to its maximum effect afterwards.

According to an example, the second heat exchanger and the first heat exchanger arranged in the first steam supply line, downstream of the steam generator, are combined in a three-fluid heat exchanger.

According to an example, the system comprises a second heat exchange module configured to provide a thermal exchange between the second air supply line and the second dioxygen discharge line.

Thus, the second heat exchange module allows the incoming air stream to be heated by the heat from the outgoing stream of dioxygen.

According to an example, the system comprises a compressor arranged in the second air supply line and intended to compress the air, preferably arranged upstream of the second heat exchange module and preferably downstream of the third heat exchanger of the recovery module.

The terms upstream and downstream, inlet and outlet, at a given point, refer to the direction of circulation of the fluid.

A parameter "substantially equal to/above/below" a given value means that this parameter is equal to/above/below the given value, plus or minus 10%, or even plus or minus 5% of this value.

The system according to the invention comprises a high temperature electrolyser 1 (HTE). Preferably, the electrolyser 1 is of the SOEC type, i.e. a Solid Oxide Electrolyte Cell.

The system comprises multiple supply and discharge lines connected to the electrolyser 1. Thus, a line is understood to be a duct, a tube or set of ducts or tubes which allow the transport of fluid to and from the electrolyser 1.

The system according to the invention comprises a first supply line 2 of the electrolyser 1 capable of supplying the electrolyser 1 with steam. According to one option, the first supply line 2 is configured to supply the electrolyser 1 with steam, which means that the first supply line 2 can supply a mixture of steam and other gas(es), for example air or dihydrogen or carbon dioxide. Upstream in this first supply line 2, the steam is not yet formed and the first supply line 2 is configured to receive liquid water. According to a preferred option, the first supply line 2 comprises a first portion receiving liquid water and a second portion receiving steam. Preferably, the first portion is located upstream of a steam generator 6 and the second portion is located downstream of said steam generator 6.

The system according to the invention comprises a first discharge line 4 capable of discharging dihydrogen (H 2) from the electrolyser 1. Preferably, the first discharge line 4 receives the dihydrogen. The dihydrogen is advantageously produced by the electrolyser 1. The dihydrogen is in gaseous form. The first discharge line 4 can discharge a mixture of dihydrogen and steam, so-called waste which has not been decomposed by the electrolyser 1.

The system according to the invention comprises a second discharge line 3 capable of discharging dioxygen ($O_2$) from the electrolyser 1. Preferably, the second discharge line 3 receives dioxygen. The dioxygen is advantageously produced by the electrolyser 1. The dioxygen is in gaseous form. According to one option, the second discharge line 3 discharges a gas enriched with dioxygen, for example air enriched with dioxygen.

In the following description, the first supply line 2 is referred to as the first steam supply line 2, the first discharge line 4 is referred to as the first dihydrogen discharge line 4 and the second discharge line 3 is referred to as the second dioxygen discharge line 3 without any restriction as to the gas, fluid or mixture that can be transported in these lines.

According to one option, the system comprises a first heat exchange module 5 configured to ensure a thermal exchange between the first steam supply line 2 and the first dihydrogen discharge line 4. This heat exchange module is configured to transfer the heat of the dihydrogen from the electrolyser 1 to the water to be supplied to the electrolyser 1. A stream of dihydrogen gas is used to raise the temperature of the stream of water, at the same time allowing cooling of the discharged stream of dihydrogen and which is advantageously dried and/or compressed for use.

According to one embodiment the first heat exchange module 5 comprises at least one heat exchanger 5a configured to ensure the transfer of heat from the dihydrogen to the steam. According to one preferred embodiment, the first heat exchange module 5 comprises two heat exchangers 5a, 5b, arranged in series between the first supply line 2 and the first discharge line 4. This arrangement makes it possible to provide a second heat exchanger 5b adjusted to the temperature of the dihydrogen at the output of the electrolyser 1, typically in the order of 700° C., and a first heat exchanger 5a more usually adjusted to the temperature of the dihydrogen after passing through a heat exchanger, of typically in the order of 330° C. In this way, the components are optimised for the temperatures and heat transfers to be performed.

The system according to the invention comprises a steam generator 6. The steam generator 6 is intended to produce steam from liquid water. The steam generator 6 is supplied with energy to ensure that the temperature of the liquid water is raised above its evaporation temperature. The steam generator 6 is a component which is the main energy consumer within an electrolyser system according to the prior art. The steam generator 6 is arranged in the first steam supply line 2.

According to one aspect of the invention, the system comprises a module for recovering heat energy from dihydrogen at the output of the heat exchange module 5 for the benefit of the first steam supply line 2.

According to one option, the recovery module comprises a compressor 7. The compressor 7 is arranged in the first dihydrogen discharge line 4, preferably downstream of the first heat exchange module 5. The compressor 7 is configured to compress the dihydrogen. For example, the pressure of the dihydrogen at the output of the compressor 7, and in particular in the fluidic connection L, is equal to at least 5 bars (500 kPa), for example 10 bars (1 Mpa). The compression of the dihydrogen circulating in the first discharge line 4 makes it possible to raise its temperature, preferably above the evaporation temperature of the water in the operating conditions of the steam generator 6. The compressor 7 also assists with obtaining dry and compressed dihydrogen. The location of the compressor 7 in the first dihydrogen discharge line 4 is selected to make it possible to use a compressor and materials adapted to temperatures which are too high and therefore do not require any particular component. Indeed, the compression of the dihydrogen will increase its temperature, thus it is preferable according to the invention to have a dihydrogen temperature at the inlet of the compressor 7, i.e. in the fluidic connection K of below 200° C., for example between 110° C. and 150° C. Thus, before the compression, the dihydrogen has a temperature which is too close to the evaporation temperature of the water to be used. After the compression, i.e. in the fluidic connection L, supplying the first heat exchanger 8, the temperature of the dihydrogen is for example in the order of 450° C.

According to one embodiment, the recovery module comprises a first heat exchanger 8 arranged between the first steam supply line 2 and the first dihydrogen discharge line 4. Preferably, the first heat exchanger 8 is arranged upstream of the steam generator 6 in the first supply line 2 and downstream of the compressor 7 on the first discharge line 4. The first heat exchanger 8 is configured to transmit the heat energy of the dihydrogen compressed to liquid water, upstream of the steam generator 6. Preferably, the first heat exchanger 8 is arranged in the first portion of the first supply line 2 receiving the liquid water.

Advantageously, the compressor 7 and the first heat exchanger 8 of the recovery module enable a gain of in the order of 5% of the total return of the electricity to the dihydrogen conversion.

The compressor 7 and the first heat exchanger 8 are advantageously used to obtain dry and compressed dihydrogen. Thus, the compressor 7 and the first heat exchanger 8 provide a compression/cooling of the dihydrogen. The cooling allows the condensation of some of the water present in the dihydrogen. As the pressure increases through compression, more liquid water can be extracted from the dihydrogen gas mixture. The compression causes the temperature to increase.

According to one embodiment, the system comprises a second heat exchanger 9 arranged in the first steam supply line 2 and in the second dioxygen discharge line 3. The second heat exchanger 9 is preferably arranged in the first supply line 2 downstream of the first heat exchanger 8 and upstream of the generator 6. The second heat exchanger 9 is arranged in the first portion of the first supply line 2. This second heat exchanger 9 is configured to ensure the thermal transfer of heat taken from the stream of dioxygen discharged from the electrolyser 1 and circulating in the second discharge line 3 for the benefit of the steam supply line 2. The second heat exchanger 9 is configured to transmit thermal energy from the dioxygen at the output of the electrolyser 1 to the liquid water, upstream of the steam generator 6.

According to one option, the first heat exchanger 8 and the second heat exchanger 9 are combined into a three-fluid heat exchanger. The three-fluid heat exchanger performs the exchanges as the first heat exchanger 8 and the second heat exchanger 9, i.e. from the dihydrogen circulating in the first discharge line 4 to the liquid water circulating in the first supply line 2 and from the dioxygen circulating in the second discharge line 3 towards the liquid water circulating in the first supply line 2.

According to one embodiment, the system comprises a second supply line 10 suitable for supplying air to the electrolyser 1. Preferably, the second supply line 10 reroutes the air. According to one option, the second supply line 10 is configured to supply the electrolyser 1 with air, this means that the second supply line 10 can supply air, the air being for example a gaseous mixture which allows the cell of the electrolyser 1 to be swept, and takes away the dioxygen produced by the electrolyser 1. The second supply line 10 is also referred to as the second air supply line 10.

According to this embodiment, it is advantageous that the system according to the invention comprises a second heat exchange module 11, configured to ensure a thermal exchange between the second air supply line 10 and the second dioxygen discharge line 3. This heat exchange module 11 is configured to transfer the heat of the dioxygen from the electrolyser 1 to the air to be supplied to the electrolyser 1. A stream of dioxygen gas ensures that the temperature of the airstream is increased which also allows the discharged stream of dioxygen to be cooled.

According to one embodiment the second heat exchange module 11 comprises at least one heat exchanger 11a configured to ensure the heat transfer from dioxygen to air. According to a preferred embodiment, the second heat exchange module 11 comprises two heat exchangers 11a, 11b, arranged in series between the second supply line 10 and the second discharge line 3. This arrangement makes it possible to provide a second heat exchanger 11b adjusted to the temperature of the dioxygen at the output of the electrolyser 1, typically in the order of 700° C., and a first heat exchanger 11a, more usually adapted to the temperature of the dioxygen after passing through a heat exchanger, is typically around 330° C. In this way, the components are optimised for the temperatures and heat transfers to be performed.

The system preferably comprises a compressor 12 arranged in the second supply line 10 for the air supply. The compressor 12 is preferably arranged upstream of the second heat exchange module 11, if provided. The compressor 12 is intended to ensure the compression of the air intended to be supplied to the electrolyser 1. The compression of the air contributes advantageously to increasing the temperature of the air before it enters the electrolyser 1.

According to one embodiment, the system comprises means for processing the flow of dihydrogen produced. The dihydrogen produced by the electrolyser 1 and which leaves the latter via the first discharge line 4 initially has a very high temperature corresponding to the reaction temperature of the electrolyser 1. However, in order to be used, the dihydrogen preferably has to be brought to a temperature close to ambient temperature. Furthermore, the dihydrogen discharged from the electrolyser 1 via the first discharge line 4 may include steam carried along with the stream of dihydrogen. It is therefore also preferred to separate the dihydrogen from any steam carried along with it by drying it.

The system according to the invention comprises advantageously for this purpose at least one first processing step intended for drying and/or compressing the produced dihydrogen.

According to one option, the first processing step comprises a heat exchanger. The heat exchanger is arranged in the first discharge line 4, preferably downstream of the first heat exchange module 5. This heat exchanger, according to a first option, is an air cooler, i.e. a heat exchanger between a fluid and a gas, the gas being set in motion by a fan. According to another option, the heat exchanger is a standard cooler, i.e. without a fan, this solution being less effective however. According to the option shown in FIG. 1, the heat exchanger is referred to as a third heat exchanger 16 and ensures the heat exchange between the fluid and a gas and in particular the air intended to supply the electrolyser 1.

According to one option, the first processing step comprises an air cooler, not shown in FIG. 1, but arranged at the position of the third heat exchanger 16 described below to which the fluidic connection 110 is removed. The first air cooler is arranged in the first discharge line 4, preferably downstream of the first heat exchange module 5 and more preferably downstream of the first heat exchanger 8 of the heat energy recovery module. According to the option shown in FIG. 1, the air cooler is replaced by a third heat exchanger 16. The system then comprises a third exchanger 16 arranged in the first dihydrogen discharge line 4 and in the second air supply line 10. In this way, the air intended to enter the electrolyser 1 is preheated by transferring heat from the dihydrogen. Preferably, the arrangement of the third heat exchanger 16 corresponds to that of the air cooler described above, i.e. downstream of the first heat exchanger 8 of the recovery module.

The first processing step advantageously comprises a liquid/gas separator 17 arranged downstream of the air cooler or the third heat exchanger 16, according to the embodiment. The separator 17 makes it possible to separate the liquid water from the gaseous dihydrogen, the liquid water resulting from the cooling of the steam in the air cooler or in the third heat exchanger 16 to below its condensation point.

According to a preferred option, the system comprises a second processing step arranged downstream of the first processing step in the first discharge line 4. The second processing step makes it possible to complete the drying of the dihydrogen. The second processing step comprises advantageously a heat exchanger which, as for the first step, can be a standard cooler, an air cooler 19 or third heat exchanger between a fluid (dihydrogen) and the air intended to supply the electrolyser 1. The second step comprises a liquid/gas separator 20. Preferably, the system comprises, between the first processing step and the second processing step, a compressor 18 configured to allow the second processing by the air cooler 19 by previously increasing the temperature of the mixture so that it can be cooled again.

At the end of the first processing step and/or the second processing step, if provided, the liquid water is preferably recycled by being returned to the first steam supply line 2 via a water recycling line 21. The water recycling line is fluidically connected to the first supply line 2, preferably upstream of the steam generator 6, preferably upstream of the first heat exchanger 8 of the thermal energy recovery module, i.e. preferably in the first portion of the first supply line 2. The dihydrogen is used in turn and in particular stored after standard treatments.

According to a not shown option, the air cooler 19 is replaced. For example, the air cooler of the first processing step is replaced by the third exchanger 16 and the air cooler 19 of the second processing step is replaced by a fourth exchanger. The fourth exchanger is arranged in the first dihydrogen discharge line 4, preferably downstream of the third heat exchanger 16, and in the second air supply line 10, preferably upstream of the third heat exchanger 16.

According to one option, the system comprises at least one complementary heat source configured to heat the steam entering the electrolyser 1 to a predefined target temperature. The complementary heat source is advantageously arranged in the first steam supply line 2, preferably downstream of the first heat exchange module 5. The complementary heat source is for example an electric heater 14.

According to one option, the system comprises at least one complementary heat source configured to heat the air entering the electrolyser 1 to a predefined target temperature. The complementary heat source is advantageously arranged in the second air supply line 10, preferably downstream of the second heat exchange module 11. The complementary heat source is for example an electric heater 13.

According to one embodiment, the system comprises at least one pump 15 arranged in the first steam supply line 2 configured to set in motion the liquid water in the first portion of the first supply line 2 upstream of the steam generator 6.

The system preferably comprises a pump 22 in the water recycling line 21. The pump 22 is configured to set in motion the liquid water circulating in the water recycling line 21 and originating from the gas/liquid separator 20.

The electrolyser 1 receives the steam and advantageously air and releases dihydrogen and dioxygen.

Preferably, the electrolyser 1 is connected fluidically to the first steam supply line 2. The first steam supply line 2 provides the fluidic connection of components arranged upstream of the electrolyser 1 in said first supply line 2. The following description is made starting upstream of the electrolyser 1 and following the direction of flow in the first supply line 2. The first supply line 2 provides the fluidic connection of the first heat exchanger 8 of the recovery module to the second heat exchanger 9 of the recovery module, then the fluidic connection of the second heat exchanger 9 of the recovery module to the steam generator 6, then the fluidic connection of the steam generator 6 to the first heat exchange module 5, preferably to the first heat exchanger 5*a*, then the fluidic connection of the first heat exchanger 5*a* to the second heat exchanger 5*b*, then the fluidic connection of the second heat exchanger 5*b* to the electric heater 14, then the fluidic connection of the electric heater 14 to the electrolyser 1.

Preferably, the electrolyser 1 is connected fluidically to a first dihydrogen discharge line 4. The first discharge line 4 ensures the fluidic connection of components arranged downstream of the electrolyser 1 in said first discharge line 4. The following description is made starting from the electrolyser 1 and following the direction of flow in the first discharge line 4 from the electrolyser 1. The first discharge line 4 ensures the fluidic connection of the electrolyser 1 with the first heat exchange module 5, more preferably with the second heat exchanger 5*b*, then the fluidic connection of the second heat exchanger 5*b* to the first heat exchanger 5*a*, then the fluidic connection of the first heat exchanger 5*a* to the compressor 7, then the fluidic connection of the compressor 7 to the first exchanger 8 of the recovery module then the fluidic connection of the first exchanger 8 of the recovery module to the third heat exchanger 16 or air cooler, then the fluidic connection of the third heat exchanger 16 to the liquid/gas separator 17, then the fluidic connection of the liquid/gas separator 17 to the compressor 18, then the fluidic connection of the compressor 18 to the air cooler 19, then the fluidic connection of the air cooler 19 to the liquid/gas separator 20.

Preferably, the electrolyser 1 is connected fluidically to a second dioxygen discharge line 3. The second discharge line 3 ensures the fluidic connection of components arranged downstream of the electrolyser 1 in said second discharge line 3. The following description is made starting from the electrolyser 1 and following the direction of circulation in the second discharge line 3 from the electrolyser 1. The second discharge line 3 ensures the fluidic connection of the electrolyser 1 to the second heat exchange module 11, more preferably to the second heat exchanger 11*b*, then the fluidic connection of the second heat exchanger 11*b* to the first heat exchanger 11*a*, then the fluidic connection of the first heat exchanger 11*a* to the second heat exchanger 9 of the recovery module.

Preferably, the electrolyser 1 is connected fluidically to the second air supply line 10. The second supply line 10 ensures the fluidic connection of components arranged upstream of the electrolyser 1 in said second supply line 10. The second supply line ensures the fluidic connection of the compressor 12 to the first heat exchanger 11*a*, then the fluidic connection of the first heat exchanger 11*a* to the second heat exchanger 11*b*, then the fluidic connection of the second heat exchanger 11*b* to the electric heater 13, then the fluidic connection of the electric heater 13 to the electrolyser 1. According to one option, upstream of the compressor 12, the second supply line ensures the fluidic connection of the third heat exchanger 16 to the compressor 12.

The system comprises fluidic connections described below and forming part of different supply lines 2, 10 and discharge lines 3, 4 of the system.

Concerning the first supply line 2, it advantageously comprises a fluidic connection A connected to the inlet of the pump 15.

Advantageously, the first supply line 2 comprises a fluidic connection B connected between the outlet of the pump 15 and the inlet of the first heat exchanger 8.

Advantageously, the first supply line 2 comprises a fluidic connection C connected between the outlet of the first heat exchanger 8 and the second heat exchanger 9.

Advantageously, the first supply line 2 comprises a fluidic connection D connected between the outlet of the second heat exchanger 9 and the inlet of the steam generator 6.

Advantageously, the first supply line 2 comprises a fluidic connection E connected between the outlet of the steam generator 6 and the inlet of the first heat exchanger 5*a* of the heat exchange module 5.

Advantageously, the first supply line 2 comprises a fluidic connection F connected between the outlet of the first heat exchanger 5*a* and the inlet of the second heat exchanger 5*b*.

Advantageously, the first supply line 2 comprises a fluidic connection J connected between the outlet of the second heat exchanger 5*b* and the inlet of the electric heater 14.

Advantageously, the first supply line 2 comprises a fluidic connection H connected between the outlet of the electric heater 14 and the inlet of the electrolyser 1.

Concerning the first discharge line 4, it comprises advantageously a first fluidic connection I between the outlet of the electrolyser 1 and the inlet of the second heat exchanger 5*b* of the first heat exchange module 5.

Advantageously, the first discharge line 4 comprises a fluidic connection J between the outlet of the second heat exchanger 5*b* of the first heat exchange module 5 and the inlet of the first heat exchanger 5*a* of the first heat exchange module 5.

Advantageously, the first discharge line 4 comprises a fluidic connection K between the outlet of the first heat exchanger 5*a* and the inlet of the compressor 7.

Advantageously, the first discharge line 4 comprises a fluidic connection L between the outlet of the compressor 7 and the inlet of the first heat exchanger 8 of the recovery module.

Advantageously, the first discharge line 4 comprises a fluidic connection M between the outlet of the first heat exchanger 8 and the third heat exchanger 16, which can be replaced by an air cooler.

Advantageously, the first discharge line 4 comprises a fluidic connection N between the outlet of the third heat exchanger 16 which can be replaced by an air cooler and the inlet of the separator 17.

Advantageously, the first discharge line 4 comprises a fluidic connection O between the outlet of the separator 17 and the inlet of the compressor 18.

Advantageously the first discharge line 4 comprises a fluidic connection P between the outlet of the compressor 18 and the inlet of the air cooler 19.

Advantageously, the first discharge line 4 comprises a fluidic connection Q between the outlet of the air cooler 19 and the separator 20.

Advantageously, the first discharge line 4 comprises a fluidic connection R ensuring the outlet of dihydrogen from the separator 20.

Concerning the second dioxygen discharge line 3, it comprises advantageously a fluidic connection 100 between the outlet of the electrolyser 1 and the inlet of the second heat exchanger 11*b* of the second heat exchange module 11.

Advantageously, the second discharge line 3 comprises a fluidic connection 101 between the outlet of the second heat exchanger 11*b* and the inlet of the first heat exchanger 11*a* of the second heat exchange module 11.

Advantageously, the second discharge line 3 comprises a fluidic connection 102 between the outlet of the first heat exchanger 11*a* and the inlet of the second heat exchanger 9.

Advantageously, the second discharge line 3 comprises a fluidic connection 103 between the outlet of the second heat exchanger 9 and the exterior.

Concerning the second air supply line 10, it comprises advantageously a fluidic connection 110 between the outlet of the third heat exchanger 16 and the inlet of the compressor 12.

Advantageously, the second supply line 10 comprises a fluidic connection 111 between the outlet of the compressor 12 and the inlet of the first heat exchanger 11a of the second heat exchange module 11.

Advantageously, the second supply line 10 comprises a fluidic connection 112 between the outlet of the first heat exchanger 11a and the inlet of the second heat exchanger 11b of the second heat exchange module 11.

Advantageously, the second supply line 10 comprises a fluidic connection 113 between the outlet of the second heat exchanger 11b and the inlet of the electric heater 13.

Advantageously, the second supply line 10 comprises a fluidic connection 114 between the outlet of the electric heater 13 and the inlet of the electrolyser 1.

In operation, the liquid water enters the first steam supply line 2, more precisely the first portion via the fluidic connection A. The fluidic connection A is advantageously connected to the inlet of the pump 15 which sets in motion the liquid water and ensures advantageously the pressurisation of the first supply line 2. The water recycling line 21 is advantageously connected fluidically to the first supply line 2 via the fluidic connection B, ensuring the fluidic connection of the outlet of pump 15 to the inlet in the first heat exchanger 8 of the recovery module via the fluidic connection B. The recycled water and the liquid water enter into the first heat exchanger 8 of the recovery module. The temperature of the water is increased by recovering the calories of the dihydrogen circulating in the first heat exchanger 8. The heated water leaves the first heat exchanger 8 via the fluidic connection C and enters, preferably directly, i.e. without any intermediate element, the second heat exchanger 9. The temperature of the water increases by recovering the heat from the dioxygen circulating in the second heat exchanger 9. The hot liquid water leaves the second heat exchanger 9 via the fluidic connection D at a temperature advantageously close to the evaporation temperature, i.e. +/−5° C. and enters, preferably directly, into the steam generator 6. The liquid water is transformed to steam by the steam generator 6.

According to the invention, the energy to be supplied by the steam generator 6 for transforming liquid water to steam is reduced by the heat energy recovery module and in particular to the first heat exchanger 8 and advantageously also to the second heat exchanger 9, ensuring an increase in temperature of the liquid water by recovering thermal energy from the dihydrogen and dioxygen produced by the electrolyser 1.

The steam leaves the steam generator 6 via the fluidic connection E and enters, preferably directly, the first heat exchange module 5, preferably the first heat exchanger 5a. The steam is heated in the first heat exchanger 5a by recovering heat from the dihydrogen circulating in the first heat exchanger 5a. The superheated steam leaves the first heat exchanger 5a via the fluidic connection F and enters, preferably directly, the second heat exchanger 5b. The steam is heated again in the second heat exchanger 5b by recovering heat from the dihydrogen circulating in the second heat exchanger 5b. The superheated steam leaves the second heat exchanger 5b via the fluidic connection F and enters, preferably directly, the electric heater 14 if necessary. The electric heater 14 provides the final increase in temperature which may be necessary so that the steam reaches a predefined target temperature to enter the electrolyser 1. The steam leaves the electric heater 14 via the fluidic connection H and enters, preferably directly, the electrolyser 1.

The electrolyser 1 is supplied with electric current at a predefined voltage and intensity to ensure the electrolysis and thus the production of dihydrogen and dioxygen.

The dihydrogen leaves the electrolyser 1 via the first discharge line, via the fluidic connection I and enters, preferably directly, the first heat exchange module 5, preferably the second heat exchanger 5b. The dihydrogen leaves the electrolyser in a hot gaseous state, it is necessary to lower its temperature to use and/or store it. The heat from the dihydrogen is therefore recovered via the first supply line and more precisely the steam circulating there. In the second heat exchanger 5b, the temperature of the dihydrogen is lowered by the transfer of heat to the benefit of the steam circulating in the second heat exchanger 5b. The cooled dihydrogen leaves the second heat exchanger 5b via the fluidic connection J and enters, preferably directly, the first heat exchanger 5a. In the first heat exchanger 5a, the temperature of the dihydrogen is again lowered by transferring heat to the benefit of the steam circulating in the first heat exchanger 5a. The cooled dihydrogen leaves the first heat exchanger 5a via the fluidic connection K and enters, preferably directly, the compressor 7. On passing through the compressor 7, the dihydrogen is compressed and its temperature increases, preferably above the evaporation temperature of the water. The dihydrogen leaves the compressor 7 via the fluidic connection L and enters, preferably directly, the first heat exchanger 8 of the recovery module. The temperature of the dihydrogen heated by the compression is lowered by heat transfer to the benefit of the liquid water circulating in the first heat exchanger 8. The dihydrogen leaves the first heat exchanger 8 via the fluidic connection M at a temperature at which it left the first heat exchange module 5 via the fluidic connection K. The dihydrogen then passes into the third heat exchanger 16 or the air cooler ensuring the cooling of the dihydrogen and advantageously the heating of the air circulating in the second supply line 10 and is intended for introduction into the electrolyser 1. The dihydrogen leaves the third heat exchanger 16 or the air cooler via the fluidic connection N and enters, preferably directly, the liquid/gas separator 17, ensuring the condensation of the dihydrogen. The dihydrogen leaves the liquid/gas separator 17 via the fluidic connection O and if necessary is further compressed for further condensation. In this case, the dihydrogen leaves the liquid/gas 17 separator via the fluidic connection O and enters, preferably directly, the compressor 18 from where it leaves via the fluidic connection P and enters, preferably directly, the air cooler 19 or a heat exchanger ensuring the cooling of the dihydrogen and advantageously the heating of the air which can be introduced into the electrolyser 1. The dihydrogen leaves the air cooler 19 or a heat exchanger via the fluidic connection Q and enters, preferably directly, the liquid/gas separator 20 ensuring the condensation of the dihydrogen. The condensed dihydrogen leaves the liquid/gas separator 20 via the fluidic connection R and can be used or stored. The condensed liquid water recovered from the liquid/gas separator 17, can be recycled in the first steam supply line 2 via fluidic connection with the water recycling line 21.

The dioxygen produced by the electrolyser leaves via the second discharge line 3, via the fluidic connection 100 and enters, preferably directly, the second heat exchange module 11, preferably the second heat exchanger 11b. The dioxygen leaves the electrolyser in a hot gaseous state, it is necessary to lower its temperature for releasing into the air. The heat from the dioxygen is therefore advantageously recovered by the second supply line 10 and more precisely the air circulating there. In the second heat exchanger 11*b*, the temperature of the dioxygen is lowered by transferring heat to the benefit of the air circulating in the second heat exchanger 11*b*. The cooled dioxygen leaves the second heat exchanger 11*b* via the fluidic connection 101 and enters, preferably directly, the first heat exchanger 11*a*. In the first heat exchanger 11*a*, the temperature of the dioxygen is again lowered by transferring heat to the benefit of the air circulating in the first heat exchanger 11*a*. The cooled dioxygen leaves the first heat exchanger 11*a* via the fluidic connection 102 and advantageously enters, preferably directly, the second heat exchanger 9 of the recovery module. By passing into the second heat exchanger 9, the temperature of the dioxygen is again lowered by transferring heat to the benefit of the liquid water circulating in the second heat exchanger 9. The air leaves the second heat exchanger via the fluidic connection 103 and is released into the air.

According to one option, air is supplied to the electrolyser 1. The air arrives through the second supply line 10. Advantageously, the air passes through the third heat exchanger 16 replacing the air cooler and recovers heat from the dihydrogen circulating in the heat exchanger. This first heat exchange ensures a first heating of the air. The air leaves the heat exchanger 16 via the fluidic connection 110 and enters, preferably directly, the compressor 12. The air is compressed by the compressor 12 and its temperature increases. The air leaves the compressor 12 via the fluidic connection 111 and enters, preferably directly, the second heat exchange module 11, preferably the first heat exchanger 11*a*. The air is heated in the first heat exchanger 11*a* by recovering heat from the dioxygen circulating in the first heat exchanger 11*a*. The superheated air leaves the first heat exchanger 11*a* via the fluidic connection 112 and enters, preferably directly, the second heat exchanger 11*b*. The air is again heated in the second heat exchanger 11*b* by recovering heat from the dioxygen circulating in the second heat exchanger 11*b*. The superheated air leaves the second heat exchanger 11*b* via the fluidic connection 113 and enters, preferably directly, the electric heater 13 if necessary. The electric heater 13 provides the last increase in temperature which may be necessary for the air to reach a predefined target temperature to enter the electrolyser 1. The air leaves the electric heater 13 via the fluidic connection 114 and enters, preferably directly, the electrolyser

| Fluidic connection | Temperature ° C. | Pressure Bar |
|---|---|---|
| A | 20 | |
| B | 20 | 1.8 |
| C | 115 | |
| D | 115 | |
| E | 112 | |
| F | 300 | |
| G | 614 | |
| H | 700 | |
| I | 700 | |
| J | 330 | |
| K | 117 | |
| L | 460 | |
| M | 120 | |
| N | 45 | |
| O | | |
| P | 370 | 10 |
| Q | 41 | |
| R | | |
| 100 | 700 | |

-continued

| Fluidic connection | Temperature ° C. | Pressure Bar |
|---|---|---|
| 101 | 450 | |
| 102 | 230 | |
| 110 | | |
| 111 | 65 | 1.55 |
| 112 | 350 | |
| 113 | 670 | |
| 114 | 700 | |

The invention is not limited to the embodiments described above and extends to all embodiments covered by the claims.

LIST OF REFERENCE SIGNS

1 Electrolyser
2 First steam supply line
3 Second dioxygen discharge line
4 First dihydrogen discharge line
5*a* First heat exchanger of first heat exchange module
5*b* Second heat exchanger of first heat exchange module
6 Steam generator
7 Compressor
8 First heat exchanger of recovery module
9 Second heat exchanger
10 Second air supply line
11*a* First heat exchanger of second heat exchange module
11*b* Second heat exchanger of second heat exchange module
12 Compressor
13 Electric heater
14 Electric heater
15 Pump
16 Third heat exchanger
17 Liquid/gas separator
18 Compressor
19 Air cooler
20 Liquid/gas separator
21 Water recycling line
22 Pump
A Fluidic connection entering the pump 15
B Fluidic connection between the pump 15 and the first heat exchanger
C Fluidic connection between the first heat exchanger 8 and the second heat exchanger 9
D Fluidic connection between the second heat exchanger 9 and the steam generator 6
E Fluidic connection between the steam generator 6 and the first heat exchanger 5*a*
F Fluidic connection between the first heat exchanger 5*a* and the second heat exchanger 5*b*
G Fluidic connection between the second heat exchanger 5*b* and the heater
H Fluidic connection between the heater 14 and the electrolyser 1
I Fluidic connection between the electrolyser 1 and the second heat exchanger 5*b*
J Fluidic connection between the second heat exchanger 5*b* and the first heat exchanger 5*a*
K Fluidic connection between the first heat exchanger 5*a* and the compressor 7
L Fluidic connection between the compressor 7 and the first heat exchanger 8

M Fluidic connection between the first heat exchanger 8 and the third heat exchanger 16

N Fluidic connection between the third heat exchanger 16 and the separator 17

O Fluidic connection between the separator 17 and the compressor 18

P Fluidic connection between the compressor 18 and the air cooler 19

Q Fluidic connection between the air cooler 19 and the separator 20

R Fluidic connection leaving the separator 20

100 Fluidic connection between the electrolyser 1 and the second heat exchanger 11*b*

101 Fluidic connection between the second heat exchanger 11*b* and the first heat exchanger 11*a*

102 Fluidic connection between the first heat exchanger 11*a* and the second heat exchanger 9

110 Fluidic connection between the third heat exchanger 16 and the compressor 12

111 Fluidic connection between the compressor 12 and the first heat exchanger 11*a*

112 Fluidic connection between the first heat exchanger 11*a* and the second heat exchanger 11*b*

113 Fluidic connection between the second heat exchanger 11*b* and the heater 13

114 Fluidic connection between the heater 13 and the electrolyser 1

The invention claimed is:

1. A system comprising:
a high temperature electrolyser,
a first supply line of the electrolyser configured to supply steam to the electrolyser,
a first electrolyser discharge line configured to discharge dihydrogen from the electrolyser,
a second electrolyser discharge line configured to discharge dioxygen from the electrolyser,
a first heat exchange module configured to provide heat exchange between the first supply line and the first electrolyser discharge line,
a steam generator arranged on the first supply line upstream of the first heat exchange module and configured to produce steam from liquid water, and
an energy recovery module for recovering thermal energy from the dihydrogen at an output of the first heat exchange module for benefit of the first supply line, the energy recovery module comprising:
a compressor arranged on the first electrolyser discharge line downstream of the first heat exchange module and configured to compress the dihydrogen, and
a first heat exchanger arranged on the first supply line to receive liquid water, upstream of the steam generator, and on the first electrolyser discharge line, downstream of the compressor, so as to transmit thermal energy of the compressed dihydrogen to the liquid water,
wherein the system comprises a second electrolyser supply line configured to supply air to the electrolyser and a third heat exchanger arranged on the first electrolyser discharge line, downstream of the first heat exchanger of the energy recovery module, to heat only air entering the second electrolyser supply line using heat only from the dihydrogen in the first electrolyser discharge line.

2. The system according to claim 1, comprising a second heat exchanger arranged between the second electrolyser discharge line and the first supply line, upstream of the steam generator, to transmit the thermal energy of the dioxygen to the liquid water upstream of the steam generator.

3. The system according to claim 2, wherein the second heat exchanger is arranged downstream of the first heat exchanger on the first supply line.

4. The system according to claim 2, wherein the second heat exchanger and the first heat exchanger arranged on the first supply line, upstream of the steam generator, are associated in a three-fluid heat exchanger.

5. The system according to claim 1, comprising a second heat exchange module configured to provide heat exchange between the second electrolyser supply line and the second electrolyser discharge line.

6. The system according to claim 1, comprising a compressor arranged on the second electrolyser supply line and configured to compress air.

7. The system according to claim 1, wherein the first heat exchange module comprises fourth and fifth heat exchangers designed to operate at different temperatures.

8. The system according to claim 7, wherein the fourth heat exchanger is located upstream of the fifth heat exchanger on the first electrolyser discharge line and operates at a temperature higher than a temperature of operation of the fifth heat exchanger.

9. The system according to claim 7, wherein the first heat exchange module is designed to operate at a temperature of dihydrogen exiting the electrolyser.

10. The system according to claim 1, comprising a liquid/gas separator arranged downstream of the third heat exchanger configured to condense water from the dihydrogen.

11. The system according to claim 1, comprising:
a first liquid/gas separator arranged downstream of the third heat exchanger on the first electrolyser discharge line configured to condense water from the dihydrogen;
a second compressor arranged downstream of the first liquid/gas separator configured to compress the dihydrogen from the first liquid/gas separator; and
a second liquid/gas separator configured to condense water from the dihydrogen compressed by the second compressor.

12. The system according to claim 11, comprising a water feed line arranged to supply the water condensed by the second liquid/gas separator to the first heat exchanger.

13. The system according to claim 11, wherein the compressor is configured to heat the compressed dihydrogen and transfer the heated, compressed dihydrogen to the first heat exchanger.

14. The system according to claim 5, wherein the second heat exchange module comprises sixth and seventh heat exchangers designed to operate at different temperatures.

15. The system according to claim 14, wherein the sixth heat exchanger is located upstream of the seventh heat exchanger on the first electrolyser discharge line and operates at a temperature higher than a temperature of operation of the seventh heat exchanger.

16. The system according to claim 2, comprising a second heat exchange module configured to provide heat exchange between the second electrolyser supply line and the second electrolyser discharge line, wherein the second heat exchanger is configured to receive the dioxygen discharged from the second heat exchange module on the second electrolyser discharge line.

17. The system according to claim 2, wherein:
the first heat exchanger is connected directly to the second heat exchanger via the first supply line, and
the second heat exchanger is connected directly to the steam generator via the first supply line.

18. The system according to claim 1, wherein a temperature of the dihydrogen exiting the first heat exchanger is the same as a temperature of the dihydrogen exiting the first heat exchange module.

\* \* \* \* \*